(12) United States Patent
Murphy et al.

(10) Patent No.: US 8,288,046 B2
(45) Date of Patent: Oct. 16, 2012

(54) INTEGRATED CURRENT SENSORS FOR A FUEL CELL STACK

(75) Inventors: Michael W Murphy, Manchester, NY (US); Robert L Fuss, Spencerport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1643 days.

(21) Appl. No.: 10/953,778

(22) Filed: Sep. 29, 2004

(65) Prior Publication Data

US 2006/0068237 A1    Mar. 30, 2006

(51) Int. Cl.
*H01M 8/04*    (2006.01)
(52) U.S. Cl. .................. 429/431; 429/428; 429/430
(58) Field of Classification Search .................. None
See application file for complete search history.

(56) References Cited

U.S. PATENT DOCUMENTS

| | | | |
|---|---|---|---|
| 6,541,147 B1 | 4/2003 | McLean et al. | |
| 2002/0090540 A1 | 7/2002 | Einhart et al. | |
| 2002/0094460 A1 | 7/2002 | Hortop | |
| 2003/0022052 A1* | 1/2003 | Kearl | 429/34 |
| 2003/0077498 A1* | 4/2003 | Cable et al. | 429/32 |
| 2004/0018401 A1* | 1/2004 | Fly et al. | 429/12 |
| 2004/0048113 A1 | 3/2004 | Murphy et al. | |
| 2005/0053814 A1* | 3/2005 | Imamura et al. | 429/22 |
| 2005/0084736 A1* | 4/2005 | Chang et al. | 429/38 |
| 2005/0227134 A1* | 10/2005 | Nguyen | 429/32 |

OTHER PUBLICATIONS

S.J.C. Cleghorn, C.R. Derouin, M. S. Wilson, S. Gottesfeld; "A Printed Circuit Board Approach to Measuing Current Distribution in a Fuel Cell"; Journal of Applied Electrochemistry 28 (1998) pp. 663-672.

* cited by examiner

*Primary Examiner* — Ula C Ruddock
*Assistant Examiner* — Tony Chuo
(74) *Attorney, Agent, or Firm* — Harness, Dickey & Pierce, P.L.C.

(57) ABSTRACT

A current sensor assembly that monitors current flow through segments of a fuel cell stack. The current sensor assembly includes a first plate including a first non-conductive substrate having a first conductive path therethrough and that is in electrical communication with a first segment of the fuel cell stack. A second plate includes a second non-conductive substrate having a second conductive path therethrough and that is in electrical communication with a second segment of the fuel cell stack. A first current sensor is operably disposed between the first plate and the second plate and facilitates a first current flow between the first conductive path and the second conductive path. The first current sensor generates a first current signal based on the first current flow.

12 Claims, 4 Drawing Sheets

US 8,288,046 B2

INTEGRATED CURRENT SENSORS FOR A FUEL CELL STACK

FIELD OF THE INVENTION

The present invention relates to fuel cells, and more particularly to integrated current sensors for fuel cell stacks.

BACKGROUND OF THE INVENTION

Fuel cell systems are increasingly being used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a polymer electrolyte membrane (PEM) that is sandwiched between an anode and a cathode. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

An understanding of the spatial distribution of current leaving a fuel cell of a fuel cell stack is useful for optimizing performance, operating conditions and durability of the fuel cell stack. Shunt resistors and Hall effect current sensors have been traditionally implemented to monitor the spatial distribution of current. Although shunt resistors provide high resolution of the spatial current distribution, they put an undesirable load on the fuel cell stack. Similarly, although Hall effect current sensors put no load on the fuel cell stack, traditional methods of implementing Hall effect current sensors require a complicated, space-consuming assembly that decreases the achievable resolution.

SUMMARY OF THE INVENTION

Accordingly, the present invention provides a current sensor assembly that monitors current flow through segments of a fuel cell stack. The current sensor assembly includes a first plate including a first non-conductive substrate having a first conductive path therethrough and that is in electrical communication with a first segment of the fuel cell stack. A second plate includes a second non-conductive substrate having a second conductive path therethrough and that is in electrical communication with a second segment of the fuel cell stack. A first current sensor is operably disposed between the first plate and the second plate and facilitates a first current flow between the first conductive path and the second conductive path. The first current sensor generates a first current signal based on the first current flow.

In one feature, the first current sensor is a Hall effect current sensor.

In another feature, the first plate further includes a conductive pad that provides electrical continuity between the first conductive path and the first segment of the fuel cell stack.

In another feature, the second plate further includes a conductive pad that provides electrical continuity between the second conductive path and the second segment of the fuel cell stack.

In another feature, the current sensor assembly further includes a third conductive path through the first plate that is in electrical communication with a third segment of the fuel cell stack and a fourth conductive path through the second plate and that is in electrical communication with a fourth segment of the fuel cell stack. A second current sensor is disposed between the first plate and said second plate and facilitates a second current flow between the third conductive path and the fourth conductive path. The second current sensor generates a second current signal based on the second current flow.

In still another feature, the first and second current sensors are Hall effect current sensors.

In yet another feature, the first and second current sensors generate the first and second current signals independently of one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
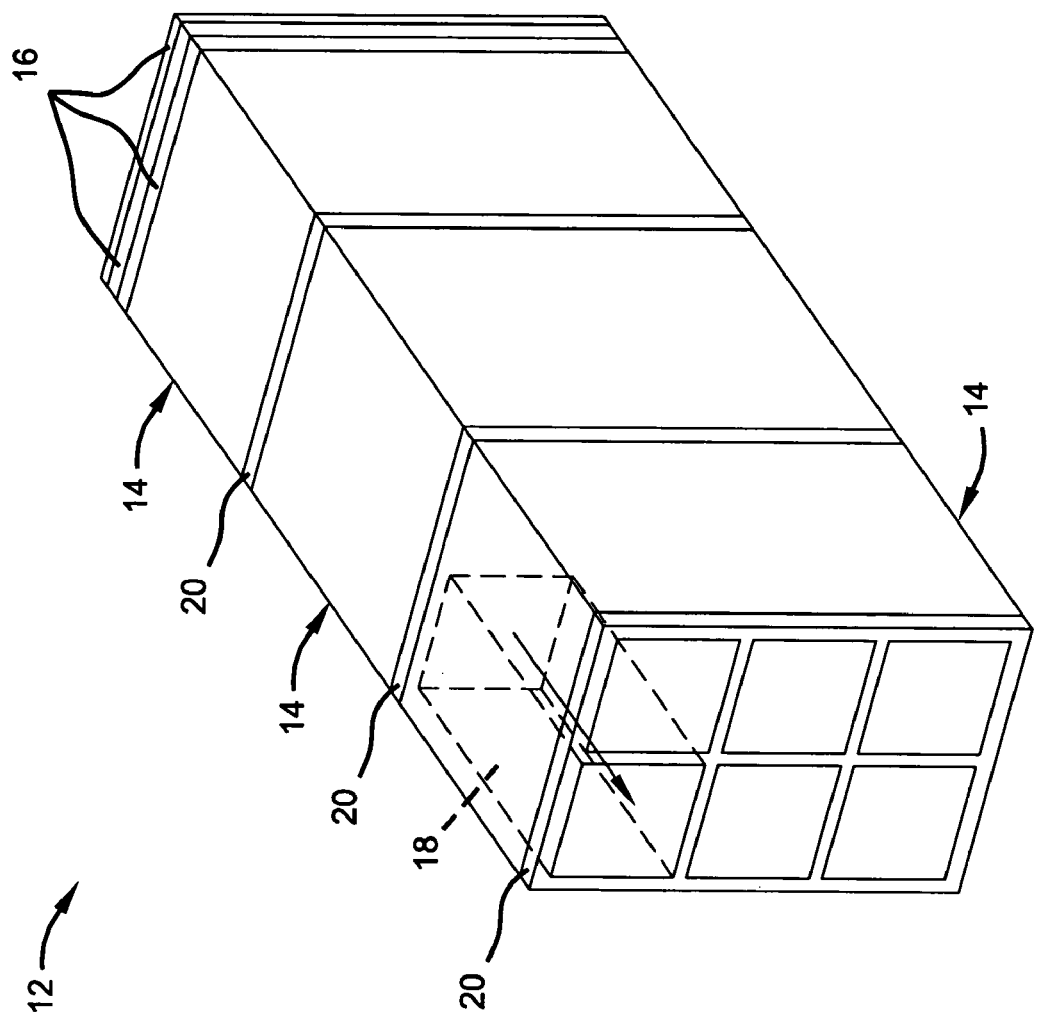
FIG. 1 is a perspective view of a fuel cell stack that includes integrated current sensor assemblies according to the present invention.

Referring now to FIG. 1, a fuel cell stack 12 is illustrated. The fuel cell stack 12 includes a series of fuel cell blocks 14. The fuel cell blocks 14 each include a series of fuel cells 16 that are divided into fuel cell segments 18, as discussed in further detail below. Integrated current sensor assemblies 20 divide the fuel cell blocks 14. Each fuel cell segment 18 is considered a sub-stack. Each fuel cell segment 18 is connected in electrical series with corresponding fuel cell segments 18 of adjacent fuel cell blocks 14 through the integrated current sensor assemblies 20. The exemplary fuel cell stack 12 of FIG. 1 includes thirty fuel cells 16 divided into three fuel cell blocks 14 by three integrated current sensor assemblies 20. Each fuel cell block 14 includes six fuel cell segments 18. Thus, the exemplary fuel cell stack 12 provides eighteen fuel cell segments 18 or sub-stacks.

Figure 2:
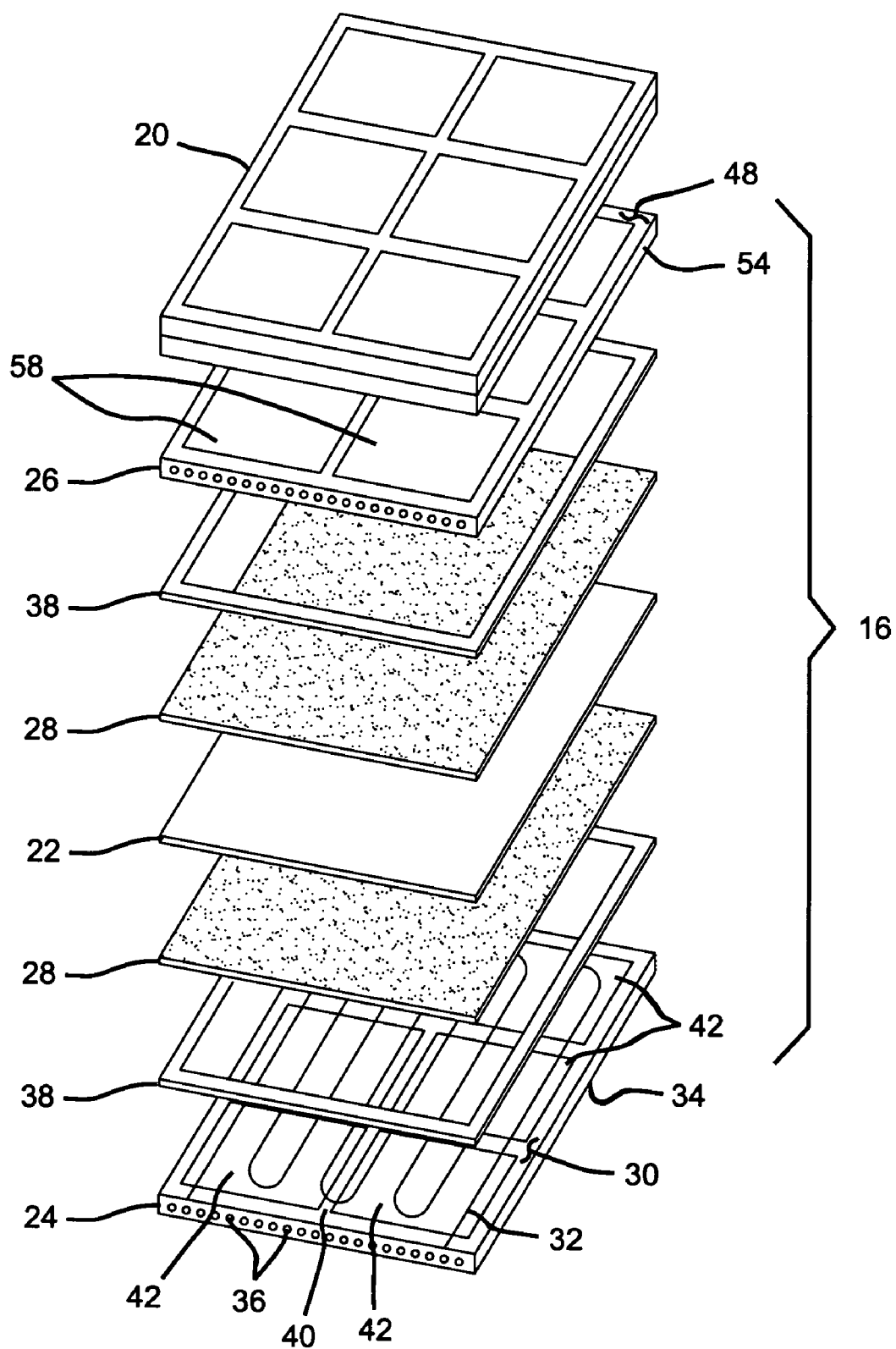
FIG. 2 is an exploded perspective view of a portion of the fuel cell stack detailing components of the integrated current sensor assembly.
Figure 4:
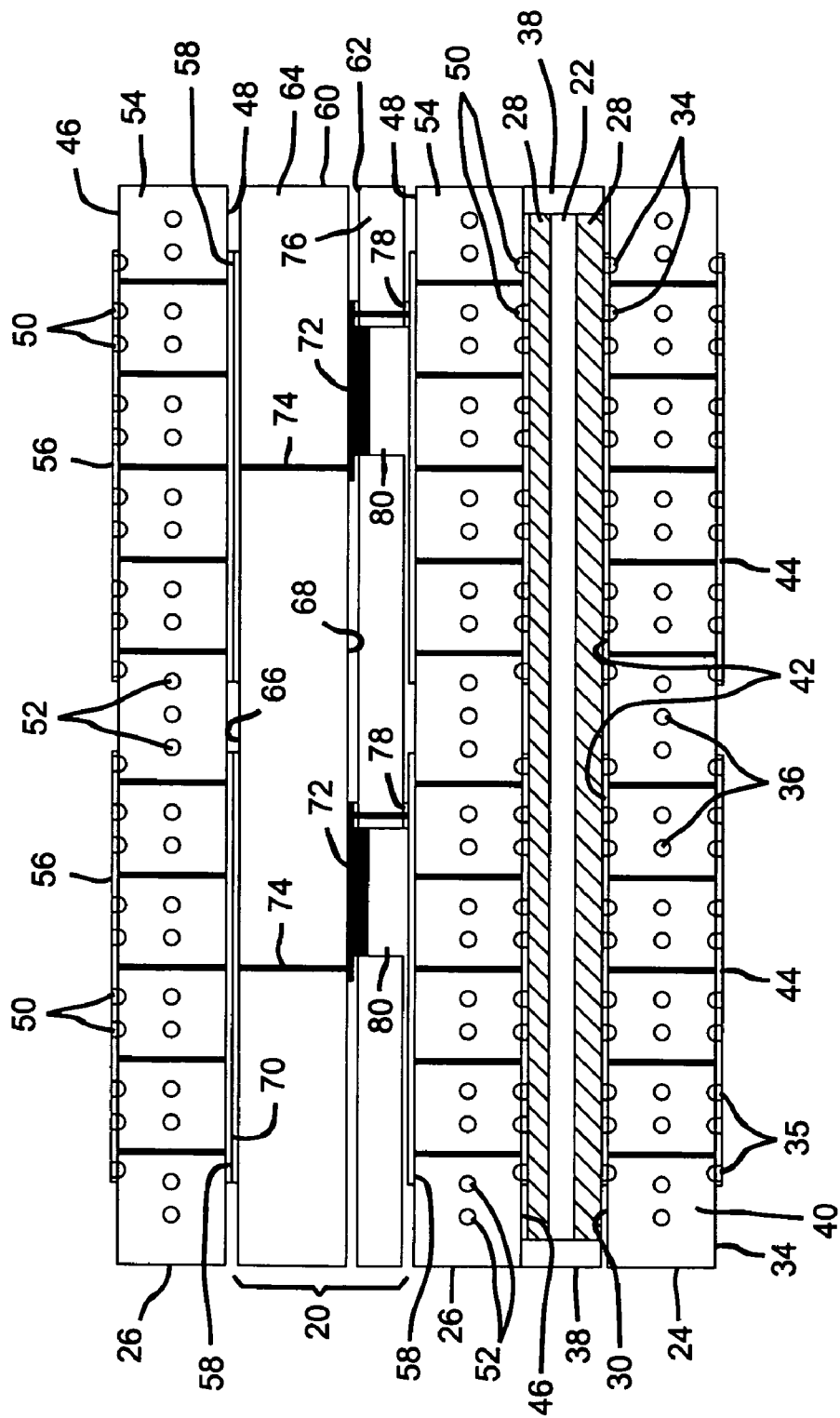
FIG. 4 is a cross-section of the combined integrated current sensor assembly.

Referring now to FIGS. 2 and 4, a fuel cell 16 is illustrated and includes a membrane electrode assembly (MEA) 22 sandwiched between a bipolar plate 24 and a modified bipolar plate 26. Diffusion media 28 are included and are disposed between the MEA 22 and the bipolar plates 24, 26. An integrated current sensor assembly 20 separates the fuel cell 16 from an adjacent fuel cell 16 (not shown).

The bipolar plate 24 includes a first reactant side 30 having reactant flow channels 32 formed therein and a second reactant side 34 having reactant flow channels 35 formed therein. A reactant (i.e., hydrogen or oxygen) flows through the reactant flow channels 32 across the first reactant side 30 and is diffused through the diffusion media 28 for reaction across the MEA 22. Another reactant (i.e., the other of hydrogen or oxygen) flows through the reactant flow channels across the second reactant side 34 and is diffused through adjacent diffusion media 28 (not shown) for reaction across an adjacent MEA 22 (not shown). A series of coolant flow channels 36 are formed through the bipolar plate 24 and facilitate coolant flow therethrough to regulate a temperature of the fuel cell stack 12. A gasket 38 is disposed between the bipolar plate 24 and the MEA 22 to seal the fluid flow through the diffusion media 28.

The bipolar plate 24 includes a non-conductive substrate 40 having series of conductive pads 42 disposed on the first reactant side 30 and a series of conductive pads 44 disposed on the second reactant side 34. The conductive pads 42 on the first reactant side 30 are in electrical communication with the conductive pads 44 on the second reactant side 34 through the non-conductive substrate 40. In this manner, the bipolar plate 24 is electrically segmented to enable current flow from a conductive pad 42 on the first reactant side 30 to a corresponding conductive pad 44 on the second reactant side 34. Although the exemplary bipolar plate 24 of FIG. 2 illustrates a six segment bipolar plate 24, it is appreciated that the bipolar plate 24 can include more or fewer segments.

The modified bipolar plate 26 includes a reactant side 46 and a collector side 48. The reactant side 46 includes reactant flow channels 50 formed therein. A reactant (i.e., hydrogen or oxygen) flows through the reactant flow channels 50 across the reactant side 46 and is diffused through the diffusion media 28 for reaction across the MEA 22. A series of coolant flow channels 52 are formed through the modified bipolar plate 26 and facilitate coolant flow therethrough to regulate a temperature of the fuel cell stack 12. A gasket 38 is disposed between the modified bipolar plate 26 and the MEA 22 to seal the fluid flow through the diffusion media 28.

The modified bipolar plate 26 includes a non-conductive substrate 54 having series of conductive pads 56 disposed on the reactant side 46 and a series of conductive pads 58 disposed on the collector side 48. The conductive pads 56 on the reactant side 46 are in electrical communication with the conductive pads 58 on the collector side 48 through the non-conductive substrate 54. In this manner, the modified bipolar plate 26 is electrically segmented to enable current flow from a conductive pad 56 on the reactant side 46 to a corresponding conductive pad 58 on the collector side 48. It is appreciated that the bipolar plate 24 and the modified bipolar plate 26 include the same number of segments (e.g., six segments).

Figure 3:
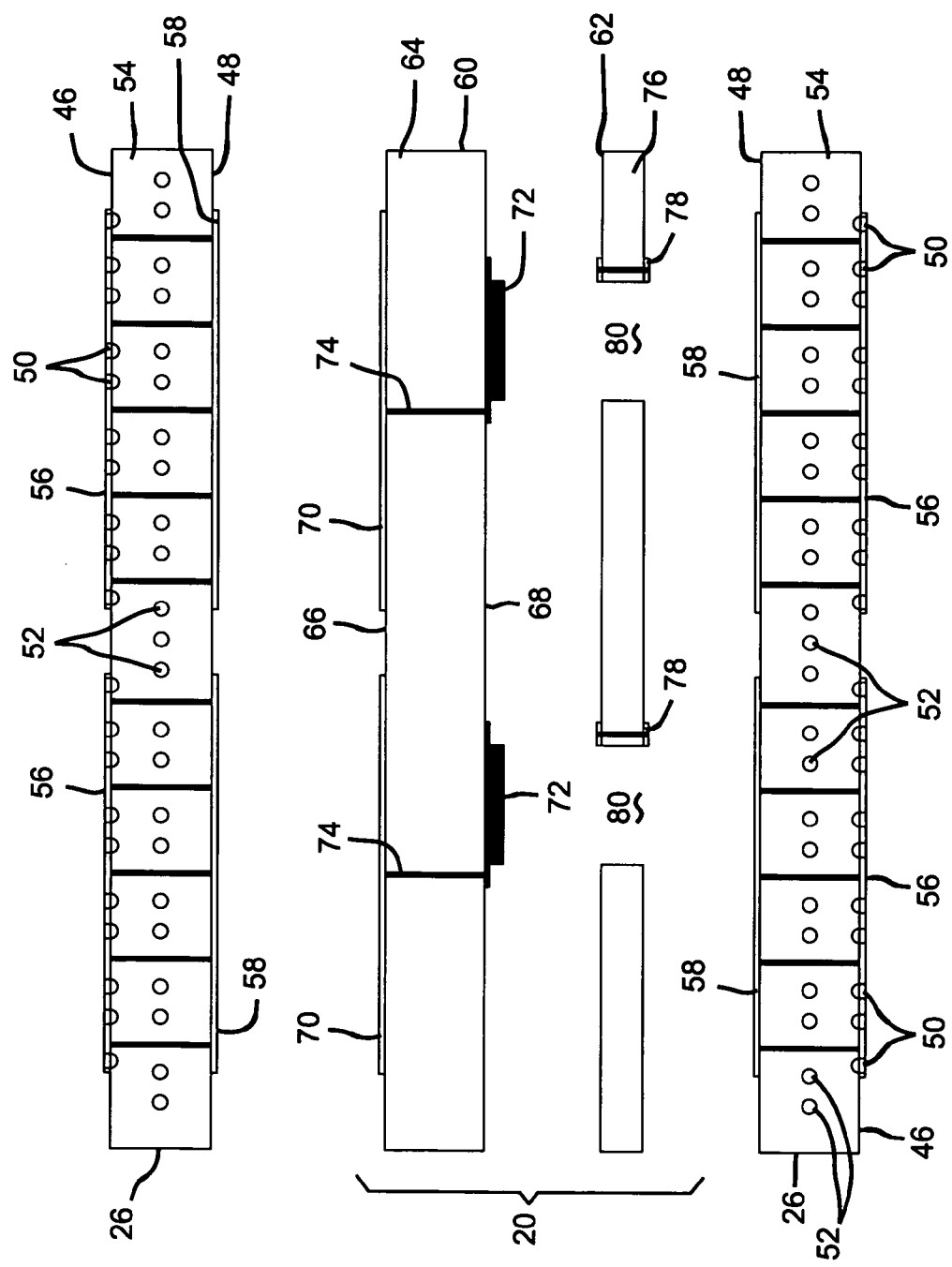
FIG. 3 is an exploded cross-section of the integrated current sensor assembly.

Referring now to FIGS. 3 and 4, the integrated current sensor assembly 20 is disposed between a set of modified bipolar plates 26. The integrated current sensor assembly 20 includes a sensor plate 60 and a spacer plate 62. The sensor plate 60 includes a non-conductive substrate 64 having a concentrator side 66 and a sensor side 68. The concentrator side 66 includes a series of conductive pads 70 that are adjacent to the conductive pads 58 of the collector side 48 of the modified bipolar plate 26.

The sensor side 68 includes a series of integrated current sensors 72 associated with each conductive pad 70. The current sensors 72 are preferably Hall effect current sensors that have a low physical profile, high current carrying capacity and ultra-low resistance. Hall effect current sensors provide a noise-immune signal and consume little power. Although not illustrated, the current sensor 72 includes a magnetic core, or transducer, and a magnetic field measurement and signal conditioning device, or Hall-Effect integrated circuit (HEIC). The transducer concentrates a magnetic field generated by the current running between the corresponding segments 18. Printed wire leads (not shown) can be integrated into the non-conductive substrate 64. The printed wire leads go to an edge of the switch plate 60 to enable current signals to be communicated from the individual current sensors 72. The wire leads include a power supply lead, a ground lead and an output signal lead.

The transducer with the HEIC provides an electrical signal in response to magnetic flux (B) generated by the current ($I_p$). The HEIC converts the sensed magnetic flux (B) to a Hall voltage ($V_H$) via the following equation:

$$V_H = b \times I_p$$

where the value b is a pre-programmed constant. The Hall voltage ($V_H$) is amplified and sent as a current signal to a controller (not shown).

The current sensors 72 are in electrical communication with the conductive pads 70 through the non-conductive substrate 64. In one embodiment, a via 74 associated with each current sensor 72 enables electrical communication between the corresponding conductive pad 70 and the current sensor 72.

The spacer plate 62 includes a non-conductive substrate 76 having current paths 78 and pockets 80 formed therein. The pockets 80 provide seat space for the current sensors 72 of the switch plate 60. The current paths 78 enable electrical communication between the current sensors 72 and the conductive pads 48 of the adjacent modified bipolar plate 26.

With particular reference to FIG. 4, operation of the fuel cell stack 12 will be described in detail. In operation, reaction of the hydrogen and oxygen across the MEA 22 generates current. The current flows through the conductive pads X on the reactant side of the modified bipolar plate 26 to the conductive pads X on the collector side. The current flows through the integrated current sensor assembly 20 to the modified bipolar plate 26 on the other side of the integrated current sensor assembly 20. More specifically, the current sensors 72 measure the current through a corresponding segment 18 of the fuel cell stack 12.

By implementing the integrated current sensor assemblies 20, current flow through individual segments 18 of the fuel cell stack 12 can be monitored. In this manner, the spatial current distribution of the fuel cell stack 12 can be better understood to enable optimization of the performance, operating conditions and durability of the fuel cell stack 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A current sensor assembly that monitors current flow through segments of a fuel cell stack, comprising:
   a first plate including a first non-conductive substrate having a first plurality of conductive pads each deployed on and defining a distinct segment of a first surface of the first non-conductive substrate and a first flow field formed in a surface of said first non-conductive substrate opposite said first surface, wherein each of the first plurality of conductive pads is in electrical communication with a plurality of conductive paths that are through the first non-conductive substrate;

a second plate including a second non-conductive substrate having a second plurality of conductive pads each deployed on and defining a distinct segment of a second surface of the second non-conductive substrate and a second flow field formed in a surface of said second non-conductive substrate opposite said second surface, wherein each of the second plurality of conductive pads is in electrical communication with a plurality of conductive paths that are through the second non-conductive substrate; and a sensor unit operably disposed between said first surface of said first plate and said second surface of said second plate, wherein the sensor unit monitors current flow through the distinct segments on the surfaces of the first and second non-conductive substrates to provide a current distribution measurement, said sensor unit including:

a sensor plate including a third non-conductive substrate having a plurality of sensor plate conductive paths therethrough and that each are in electrical communication with one of the first plurality of conductive pads, a spacer plate including a fourth non-conductive substrate having a plurality of spacer plate conductive paths therethrough and that each are in electrical communication with one of the second plurality of conductive pads, and a plurality of no-load current sensors each establishes electrical continuity between one of the plurality of sensor plate conductive paths and one of the plurality of spacer plate conductive paths and each generates a current signal based on current flow through said sensor plate conductive path.

2. The current sensor assembly of claim 1 wherein each of said plurality of current sensors is a Hall effect current sensor.

3. The current sensor assembly of claim 1 wherein said plurality of current sensors generate a plurality of current signals independently of one another.

4. The current sensor assembly of claim 1 wherein said spacer plate defines a pocket for providing seat space for each of said plurality of current sensors.

5. A fuel cell stack, comprising:
a first fuel cell having a set of first fuel cell segments defined thereacross;
a second fuel cell having a set of second fuel cell segments defined thereacross; and
a current sensor assembly that monitors current flow through said set of first fuel cell segments and said set of second fuel cell segments to provide a current distribution measurement, said current sensor assembly including:
a first plate having a first non-conductive substrate having a first plurality of conductive pads each deployed on and defining a distinct segment of a first surface of the first non-conductive substrate and a first flow field formed in a surface of said first non-conductive substrate opposite said first surface, wherein each of the first plurality of conductive pads is in electrical communication with a plurality of conductive paths that are through the first non-conductive substrate and each of the first plurality of conductive pads is only in communication with one of the first fuel cell segments and one of the second fuel cell segments;

a second plate having a second non-conductive substrate having a second plurality of conductive pads each deployed on and defining a distinct segment of a second surface of the second non-conductive substrate and a second flow field formed in a surface of said second non-conductive substrate opposite said second surface, wherein each of the second plurality of conductive pads is in electrical communication with a plurality of conductive paths that are through the second non-conductive substrate, wherein each of the second plurality of conductive pads is only in communication with one of the first cell segments and one of the second fuel cell segments;

a sensor unit operably disposed between said first surface of said first plate and said second surface of said second plate including:

a sensor plate including a third non-conductive substrate having a plurality of sensor plate conductive paths therethrough and that each are in electrical communication with only one of the first plurality of conductive pads, a spacer plate including a fourth non-conductive substrate having a plurality of spacer plate conductive paths therethrough and that each are in electrical communication with only one of the second plurality of conductive pads, and a plurality of no-load current sensors each establishes a path of electrical continuity between one of the plurality of sensor plate conductive paths and one of the plurality of spacer plate conductive paths and generates a current signal based on a current flow through said sensor plate conductive path.

6. The fuel cell stack of claim 5 wherein each of said plurality of current sensors is a Hall effect current sensor.

7. The fuel cell stack of claim 5 wherein said plurality of current sensors generate a plurality of current signals independently of one another.

8. The current sensor assembly of claim 5 wherein said spacer plate defines a pocket for providing seat space for each of said plurality of current sensors.

9. A fuel cell stack, comprising:
a first fuel cell sub-stack including a plurality of fuel cells connected in electrical series to define a set of first segments;
a second fuel cell sub-stack including a plurality of fuel cells connected in electrical series to define a set of second segments; and
a current sensor assembly that monitors current flow through said set of first segments and said set of second segments, said current sensor assembly including:
a first plate having a first non-conductive substrate having a first plurality of conductive pads each deployed on and defining a distinct segment of a first surface of the first non-conductive substrate and a first flow field formed in a surface of said first non-conductive substrate opposite said first surface, wherein each of the first plurality of conductive pads is in electrical communication with a plurality of conductive paths that are through the first non-conductive substrate and each of the first plurality of conductive pads is only in communication with one of the first segments and one of the second segments;
a second plate having a second non-conductive substrate having a second plurality of conductive pads each deployed on and defining a distinct segment of a second surface of the second non-conductive substrate and a second flow field formed in a surface of said second non-conductive substrate opposite said second surface, wherein each of the second plurality of conductive pads is in electrical communication with a plurality of conductive paths that are through the second non-conductive substrate, wherein each of the second plurality of conductive pads is only in communication with one of the first segments and one of the second segments;

a sensor unit operably disposed between said first surface of said first plate and said second surface of said second plate for monitoring current flow through said set of first segments and said set of second segments to provide a current distribution measurement, said sensor unit including:

a sensor plate including a third non-conductive substrate having a plurality of sensor plate conductive paths therethrough and that each are in electrical communication with only one of the first plurality of conductive pads, a spacer plate including a fourth non-conductive substrate having a plurality of spacer plate conductive paths therethrough and that each are in electrical communication with only one of the first plurality of conductive pads, and a plurality of no-load current sensors each operable to establish electrical continuity between one of the plurality of sensor plate conductive paths and one of the plurality of spacer plate conductive paths and to generate a current signal based on a current flow through said sensor plate conductive path.

10. The fuel cell stack of claim 9 wherein each of said plurality current sensors is a Hall effect current sensor.

11. The fuel cell stack of claim 9 wherein said plurality of current sensors generate a plurality of current signals independently of one another.

12. The current sensor assembly of claim 9 wherein said spacer plate defines a pocket for providing seat space for each of said plurality of current sensors.

* * * * *